Feb. 2, 1971  A. F. TURBAK  3,560,223

LIVER SAUSAGE WITH CASING AND METHOD OF PREPARING SAME

Filed June 16, 1969  2 Sheets-Sheet 1

ALBIN F TURBAK
*INVENTOR.*

BY David V. Munns,
Neal J. Mosely
his attorney

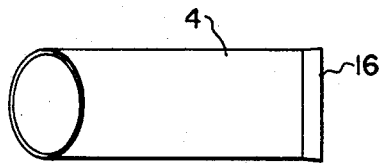
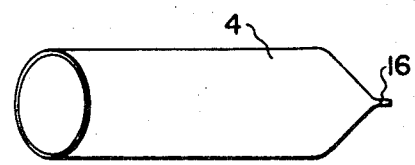
FIG. 5    FIG. 6
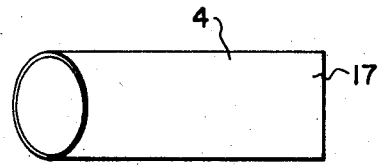
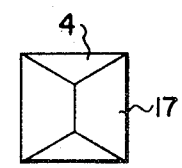
FIG. 7    FIG. 8
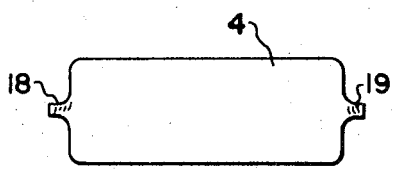
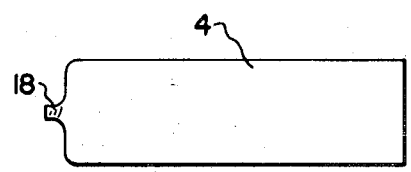
FIG. 9    FIG. 10
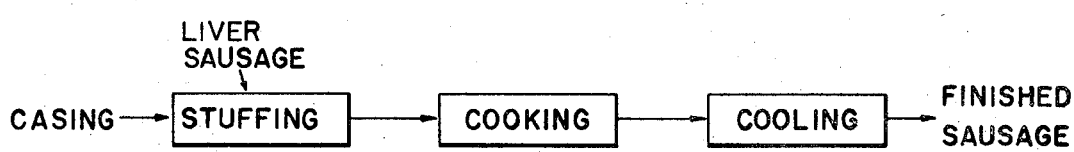
FIG. 11

United States Patent Office 3,560,223
Patented Feb. 2, 1971

3,560,223
LIVER SAUSAGE WITH CASING AND METHOD OF PREPARING SAME
Albin F. Turbak, Danville, Ill., assignor to Tee-Pak, Inc., a corporation of Illinois
Continuation-in-part of application Ser. No. 518,116, Jan. 3, 1966. This application June 16, 1969, Ser. No. 833,423
Int. Cl. A22c 11/00, 13/00
U.S. Cl. 99—109
10 Claims

ABSTRACT OF THE DISCLOSURE

Liver sausage and a method of preparing same in the form of a "chub" package comprising an in situ cooked mass of a liver sausage recipe stuffed and encased in an oxygen- and water-impermeable, end-closed casing constituted by a substantially completely stretch-resistant tube formed by jointing and heat seal-seaming a laminate of a metal foil double-face coated with film-forming thermoplastic material.

RELATED APPLICATIONS

Figure 1:
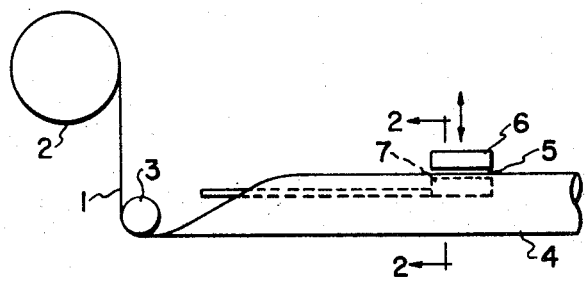

This application is a continuation-in-part application of my copending application Ser. No. 518,116, now abandoned filed Jan. 3, 1966.

DISCLOSURE OF THE INVENTION

This invention relates to new and useful improvements in liver sausages and more particularly to liver sausages encased in multi-ply casings having low moisture vapor transmission and low oxygen transmission rates. The invention is also related to improved methods for preparation of sausages.

In the manufacture of liver sausage, it has been necessary to use casings or packaging films having very low moisture vapor transmission and very low oxygen transmission rates. Saran film (polyvinylidene chloride or polyvinylidene chloride copolymers) has moisture vapor transmission and oxygen transmission characteristics which would meet liver sausage requirements. As pointed out in U.S. Pat. No. 2,961,323, however, saran films has not been entirely satisfactory for the preparation of liver sausages due to the fact that saran casings become highly stretched when stuffed with liver sausage. This problem is further aggravated by the facts that, in liver sausage manufacture, as pointed out in U.S. Pat. No. 2,866,710 and MacKenzie, Prepared Meat Product Manufacturing, 1964 (Published by AMI Center for Continuing Education, American Meat Institute), pages 18, 19, and 58, the "processing" of the product necessarily involves a cooking step wherein the liver sausage filling of a stuffed casing had to be cooked (e.g., in a water bath at 160–180° F.) to an inside temperature of at least 148° F., usually on the order of 150° F., and that under these conditions the filling swells and exerts additional pressure on the casing. In liver sausage manufacture, accordingly, saran casings have suffered from a difficulty in maintaining uniform size in the product. Some improvement in packaging characteristics has been obtained by the use of saran coated cellulose tubing or casing for packaging of liver sausage. As U.S. Patent No. 2,961,323 mentioned hereinabove further points out, however, saran coated cellulose casings, while less stretchable than unsupported saran, nevertheless do stretch to an appreciable degree (e.g., 10%) during liver sausage stuffing and processing with the result that even this improved casing has been subject to the disadvantage of uncertain quality and uniformity of product and high cost.

One of the objects of this invention is to provide a new and improved liver sausage.

It is another object of this invention to provide a liver sausage which is stable due to the casing thereof being characterized by low moisture vapor transmission and oxygen transmission rates.

Another object of this invention is the provision of a liver sausage having a casing which has strength and stretch characteristics making possible the packing of products of uniform dimensions therein.

A feature of this invention is the provision of a new and improved liver sausage having a substantially completely stretch-resistant and oxygen- and moisture-impermeable casing comprising a metal foil double-face coated with a continuous layer of a film-forming thermoplastic and formed into a continuous tube having a heat sealed longitudinally extending lap joint.

Another feature of this invention is the provision of a new and improved method for making an improved liver sausage wherein a stretch-resistant and oxygen- and water vapor-impermeable casing is provided comprising a laminate of a metal foil double-face coated with a continuous layer of a film-forming thermoplastic and formed into a continuous tube having a heat-sealed longitudinally extending seam, the casing is stuffed with liver sausage, and, after closing of the ends of the stuffed casing is completed, the sausage is cooked.

Other objects and features of this invention will become apparent from time to time throughout the specification and claims as hereinafter related.

This invention is based upon the discovery that a new and improved liver sausage is prepared using a casing which is substantially impermeable to oxygen and water vapor and prepared by forming a metal foil, coated on opposite sides wtih a continuous layer of a film-forming thermoplastic, at least one layer being heat sealable, into a continuous tube having a longitudinally extending seam and heat sealing said seam. Such a casing is strong, has substantially complete impermeability toward water vapor and oxygen, and maintains a substantially constant diameter when stuffed with liver sausage and when the stuffed liver sausage is cooked.

Figure 2:
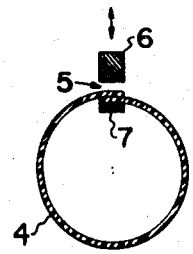
Figure 3:
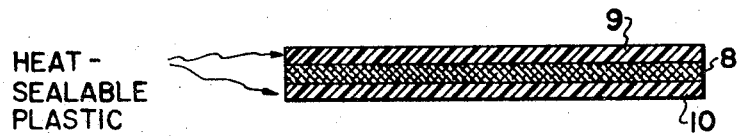
Figure 4:
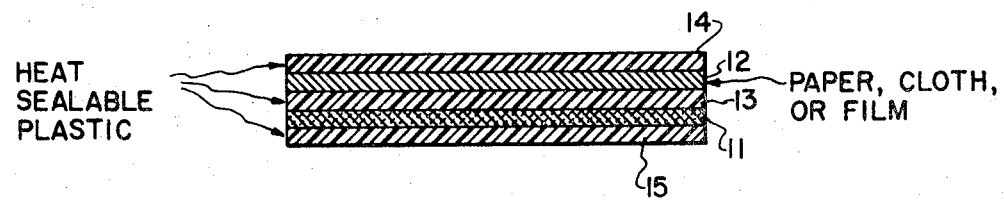

In the accompanying drawings to be taken as a part of this specification, there are clearly and fully illustrated several features of this invention, in which drawings, FIG. 1 is a diagrammatic representation of the process for forming a thermoplastic coated metal foil into a continuous multi-ply casing, FIG. 2 is a sectional view taken on the line 2—2 of FIG. 1, FIG. 3 is a view in section of a thermoplastic coated metal foil used in carrying out this invention, FIG. 4 is a view in section of another thermoplastic coated metal foil having paper, cloth or film laminated thereto for use in carrying out this invention, FIG. 5 is an isometric view of a casing formed in accordance with the process illustrated in FIG. 1 and heat sealed across one end, FIG. 6 is a plan view of the casing shown in FIG. 5, FIG. 7 is an isometric view of a casing formed in accordance with the process illustrated in FIG. 1 and having a folded and heat sealed end portion, FIG. 8 is a view in right elevation of the casing shown in FIG. 7, FIG. 9 is a view in elevation of a casing formed in accordance with the process illustrated in FIG. 1, stuffed with liver sausage and having its ends closed by a twisted and clipped closure, FIG. 10 is a view in elevation of the casing shown in FIGS. 7 and 8 when stuffed with liver sausage and closed by a twisted and clipped end closure, and FIG. 11 is a block diagram of the steps employed in producing, i.e., stuffing and processing, liver sausage.

Referring to the drawings by numerals of reference and more particularly to FIGS. 1 and 2, there is shown diagrammatically the process of preparing the multi-ply meat casing employed the present invention. In FIG. 1, a plastic coated metal foil 1 is fed from a feed roll 2 past a guide roll 3 and formed into an elongated tube 4 of indefinite length. The foil 1 is formed into tube 4 having a single thickness of metal foil around substantially the entire circumference thereof by folding foil 1 to form a joint such as lap joint 5, as shown in FIGS 1 and 2. Lap joint 5 is formed into a heat sealed lap joint by heat sealer bar 6 which reciprocates vertically and presses against forming shoe 7.

The plastic coated foil used in the preparation of casing as shown in FIGS. 1 and 2 is preferably a thin gauge aluminum foil double-faced-coated (i.e, having a coating on opposite sides) with a film-forming, heat-sealable thermoplastic material. The foil which is used is preferably one which is thick enough to provide a substantially complete oxygen and moisture vapor barrier. A cross-section of a typical foil is shown in FIG. 3 wherein there is shown a foil 8 having thermoplastic film coatings 9 and 10 on opposite sides thereof. The foil may be as thin as about 0.00035 in. and may range in thickness up to about 0.01 in. depending upon the strength desired in the foil. The thermoplastic film coatings 9 or 10 may be adherently applied to the metal foil in the form of melt-extruded coatings or may be films which are preformed and adherently laminated to the foil or may be applied in the form of a solution, dispersion, latex, emulsion, etc., and dried to form an adherent coating of the desired thickness and consistency. The coatings 9 and 10 are preferably both of a heat sealable plastic material, although one of the coatings may be heat sealable and the other not heat sealable provided that the two coatings, when folded and brought together in a face-to-face joint and heat sealed, form an adherent, non-stretchable bond. As is apparent from the disclosed use of the multi-ply casings, the films, of course, must retain a self-supporting, stretch-resistant character at the conditions employed in liver sausage processing, e.g., where contacted by hot to boiling water to heat the sausage to an inside temperature of 150° F. during the cooking thereof. Typical film-forming, heat sealable thermoplastics which may be applied to the metal foil include rubber hydrochloride, polyvinyl chloride, polyvinyl acetate, polyvinylidene chloride, polystyrene, polyethylene, or copolymers thereof. Films which are not ordinarily considered heat sealable but which may be used for one of the coatings on the foil include polypropylene and polyesters.

In FIG. 4, there is shown a cross section of a foil having a paper, cloth or film laminated thereto and provided with a heat sealable coating on opposite sides. In FIG. 4, the metal foil 11 has a layer of paper, cloth or plastic film 12 laminated and adhered thereto through use of a heat sealable film 13. Thermoplastic film layers 14 and 15 are applied over the paper, cloth or film layer 12 and to the underside of the mtal foil 11. The laminate which is shown in FIG. 4 is used to form continuous heat sealed tubes as illustrated in FIGS. 1 and 2. The tubes are preferably formed with the paper, cloth, or film layer positioned on the outside of the tube or casing. The tube or casing which is thus formed has an inner layer 15 of plastic which protects the contents of the tube from contact with the metal foil. The paper, cloth, or film layer 12 on the outside of the tube is provided for a decorative effect. The paper, cloth, or film layer 12 may be dyed or pigmented prior to lamination to the foil 11 so that the resulting product may have any desired color or pattern, including printing or decorative patterns.

In the foil laminates, as shown in FIGS. 3 and 4, the foil may range from about 0.00035 to about 0.01 in. in thickness. The thermoplastic, heat sealable coating on the metal foil may range from about 0.00001 to about 0.01 in. in thickness on each side of the metal foil and is preferably of a thickness in the range from about 0.0002 to about 0.004 in. in thickness. The thickness of the heat sealable thermoplastic coating on each side of the metal foil is determined largely by the desired properties of strength and resistance to stretch desired in the finished liver sausage product. The combination of a thin metal foil with a thermoplastic coating on opposite sides provides a product which is easily fabricated by heat sealing and which has a relatively high strength and substantially no stretch. The casing which is prepared as described above is suppliant to folding, twisting, and flattening and can be tightly stuffed with liver sausage, and the stuffed sausage is closed by conventional means including combinations of twisting and clipping or flattening and heat sealing and cooked to produce a packaged product having very accurately defined dimensions. The substantially complete resistance to stretching during stuffing and processing results in a finished liver sausage which is accurately predictable in size. This feature, coupled with the substantially complete resistance of the casing to oxygen and moisture vapor transmission and the resultant stability of the sausage, makes the liver sausage superior to essentially all present commercial liver sausages.

In FIG. 5 there is shown an isometric view of a heat sealed tube or casing 4 prepared as described in FIGS. 1 and 2. The end of the casing is closed by simply flattening the casing and forming a heat seal diametrically across the casing as shown at 16 in FIGS. 5 and 6.

In FIGS. 7 and 8 there are shown views of a casing 4 having an end closure 17 formed by folding the end of the casing in a manner substantially the same as the fold used to close the bottom of a paper bag followed by application of heat to the closed end to heat seal the end of the casing.

In FIG. 9 a portion of casing 4 is shown in the form in which it would appear when stuffed with liver sausage and its ends closed by twisting and clipping as indicated at 18 and 19. Similarly the casing shown in FIGS. 5 and 6 could be stuffed with liver sausage and the open end twisted and clipped closed as illustrated at 18 in FIG. 9. In FIG. 10 the casing shown in FIGS. 7 and 8 is illustrated in the form that it would appear when stuffed with liver sausage and the open end closed by twisting and clipping as indicated at 18.

FIG. 11 illustrates the steps followed in preparing liver sausage. As shown in the block diagram, in preparing liver sausage in accordance with the present invention, a mass of a conventional liver sausage recipe, exemplified by that described in MacKenzie, Prepared Meat Product Manufacturing, 1964, at page 58, initially is stuffed into a moisture- and oxygen-impermeable casing of the type exemplified by those of FIGS. 1–8. A feature of the present invention is that such casings may be typically and uniformly stuffed (after closing one end by twisting and clipping, etc.) with liver sausage without breaking or stretching. After stuffing, the resultant article is then formed into a so-called "chub" package of the type exemplified by FIGS. 9 and 10 by suitably closing the other end of the casing. The resultant stuffed sausage package then is cooked to an inside temperature of at least 148° F., e.g., about 150° F., in accordance with conventional liver sausage manufacturing practice. Typically the cooking step is carried out by contacting the sausage with a spray or bath of hot to boiling water, e.g., having a temperature of from about 160° to about 180° F., to bring the sausage to the desired internal temperature and then holding the sausage at such temperatures until desired heating is completed, usually for at least about 10 minutes. After cooking, the sausage is then cooled to about 34–40° F. The resultant liver sausage product may be used as such, or optionally may be smoked.

The following nonlimiting examples are illustrative of the scope of this invention:

EXAMPLE 1

A 1 mil aluminum foil having a two-tenths mil coating of polyvinyl chloride on each side is formed into a 3 in. diameter tube with a lap seam as illustrated in FIGS. 1 and 2. The lap seam is heat sealed as previously described. The plastic coated foil casing which is thus produced is stuffed with liver sausage and the ends sealed by twisting and clipping as illustrated in FIG. 9. The sausage is then cooked in a water bath at 165° F. to an internal temperature of 150° F. and then held in the bath for an additional 30 minutes. The sausage is then stored at 35–40° F. and 50–55% relative humidity for extended periods and periodically observed for changes.

The test reveals the sausage is quite stable. Even after three or four weeks, for example, the stored sausage displays substantially no loss in weight and no indication of brown ring formation. By comparison, liver sausage encased in regenerated cellulose casing or fibrous reinforced cellulose casing would have a loss in weight of about 15% after storage under the same conditions.

EXAMPLE 2

A paper-aluminum (2 mil/1 mil) foil laminate coated with three-tenths mil of polyethylene, as illustrated in FIG. 4, is formed into a casing with a heat sealed longitudinally extending lap joint as shown in FIG. 1. When the casing is stuffed with liver sausage and is processed as in Example 1, there is essentially no stretching and sausages are produced which are essentially uniform in diameter and stable during storage.

Sausages produced using the paper-foil laminated casing are especially advantageous since decorative product packaging is possible. The paper may be dyed or otherwise colored or printed before the final coating is applied to the paper-foil laminate so that the finished product will have suitable coloring or printing or decorations as desired. When paper-foil laminates are used, it is preferred to use a paper which has been treated with a wet strength additive, e.g., melamine-formaldehyde resin, regenerated cellulose, etc., so that the paper is not weakened if the foil or casing prepared from the foil is exposed to water under conditions where wicking may occur. It should also be noted that similar decorative effects may be obtained in the preparation of laminated foil casings by using cloth, or plastic film including regenerated cellulose film which is self-laminated or laminated to the metal foil as described above. Such cloth or film may be dyed, pigmented, or printed prior to application of the thermoplastic coating to the laminate.

Other embodiments which do not depart from the spirit and scope of the present invention, of course, will be apparent to those skilled in the art. Accordingly, it will be understood the present invention is to be limited only by the scope of the appended claims.

What is claimed is:

1. A liver sausage product comprising an in situ cooked mass of a liver sausage recipe stuffed and encased in a substantially completely oxygen- and water vapor-impermeable, end-closed casing constituted by a substantially completely stretch-resistant tube suppliant to folding, twisting, and flattening, having a single thickness of metal foil around substantially the entire circumference thereof, and formed by folding and jointing along a longitudinally extending lap seam a laminate of a metal foil having a thickness in the range from about 0.00035 inch to about 0.01 inch and double-face coated with continuous film layers of film-forming thermoplastic material having stretch resistance at elevated temperatures at least in the range of from about 160° F. to about 180° F. and heat sealing the resultant thermoplastic material at said lap seam.

2. The liver sausage product according to claim 1 wherein said metal foil is aluminum.

3. The liver sausage product according to claim 2 wherein said heat sealable thermoplastic coating is rubber hydrochloride, polyvinyl chloride, polyvinylidene chloride, polystyrene, polyethylene, polyvinyl acetate, or copolymers thereof.

4. The liver sausage product according to claim 2 wherein said aluminum foil has a layer of paper, cloth, or plastic film adhered to one of said thermoplastic coatings and another heat sealable thermoplastic coating is provided over such layer.

5. The liver sausage product according to claim 4 in which said layer is on the outside of the casing and is colored.

6. A method of preparing liver sausage comprising providing a substantially completely stretch-resistant tubular casing suppliant to folding, twisting, and flattening, having a single thickness of metal foil around substantially the entire circumference thereof, and formed by folding and jointing along a longitudinally extending lap seam a laminate of a metal foil having a thickness in the range from about 0.00035 inch to about 0.01 inch and double-face coated with continuous film layers of film-forming thermoplastic material having stretch resistance at elevated temperatures at least in the range of from about 160° F. to about 180° F. and heat-sealing the resultant thermoplastic material at said lap seam, after closing one end of said tubular casing, stuffing and filling the resultant casing with uncooked liver sausage, and after closing the remaining open end of the resultant stuffed article, heating the resultant closed package to cook the liver sausage filling thereof and provide a casing-enclosed liver sausage product.

7. The method according to claim 6 wherein said metal foil is aluminum.

8. The method according to claim 7 wherein said heat sealable thermoplastic coating is rubber hydrochloride, polyvinyl chloride, polyvinylidene chloride, polystyrene, polyethylene, polyvinyl acetate, or copolymers thereof.

9. The method according to claim 7 wherein said aluminum foil has a layer of paper, cloth, or plastic film adhered to one of said thermoplastic coatings and another heat sealable thermoplastic coating is provided over such layer.

10. The method according to claim 9 wherein said layer is on the outside of the casing and is colored.

References Cited

UNITED STATES PATENTS

| | | | |
|---|---|---|---|
| 2,773,773 | 12/1956 | Harder | 99—176 |
| 2,778,760 | 1/1957 | Hurst | 99—174 |
| 2,953,072 | 9/1960 | Conti | 99—176X |
| 2,961,223 | 11/1960 | Underwood | 99—176 |
| 2,982,457 | 5/1961 | D'Alelio | 229—3.5 |
| 3,233,815 | 2/1966 | Eggen | 99—171 |
| 3,445,055 | 5/1969 | Port | 99—171 |

FOREIGN PATENTS

| | | | |
|---|---|---|---|
| 290,384 | 11/1931 | Italy | 99—171 |

FRANK W. LUTTER, Primary Examiner

R. HALPER, Assistant Examiner

U.S. Cl. X.R.

99—176; 161—216; 229—3.5